(12) United States Patent
Hasberg et al.

(10) Patent No.: US 11,415,987 B2
(45) Date of Patent: Aug. 16, 2022

(54) METHOD FOR OPERATING A VEHICLE

(71) Applicant: Robert Bosch GmbH, Stuttgart (DE)

(72) Inventors: Carsten Hasberg, Ilsfeld-Auenstein (DE); Philipp Rasp, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 16/701,598

(22) Filed: Dec. 3, 2019

(65) Prior Publication Data
US 2020/0174476 A1 Jun. 4, 2020

(30) Foreign Application Priority Data

Dec. 3, 2018 (DE) .......................... 102018220799.2

(51) Int. Cl.
*G05D 1/00* (2006.01)
*G05D 1/02* (2020.01)

(52) U.S. Cl.
CPC ......... *G05D 1/0088* (2013.01); *G05D 1/0231* (2013.01); *G05D 1/0257* (2013.01); *G05D 2201/0213* (2013.01)

(58) Field of Classification Search
CPC ......... B60W 2550/00; B60W 2550/14; B60W 2550/20; B60W 2550/40; B60W 2550/402; B60W 2550/406; G01C 21/00; G01C 21/005; G01C 21/06; G01C 21/10; G01C 21/12; G01C 21/16; G01C 21/26; G01C 21/28; G01C 21/34; G01C 21/30; G01C 21/32; G05D 2201/0213; G05D 1/0246; G05D 1/0088; G05D 1/0231; G05D 1/0257; G05D 1/00; G05D 1/02
USPC ........................................................... 701/25
See application file for complete search history.

(56) References Cited

U.S. PATENT DOCUMENTS 8,949,016 B1 * 2/2015 Ferguson ............. G05D 1/0274
701/301
11,009,365 B2 * 5/2021 Wang ..................... G08G 1/167

FOREIGN PATENT DOCUMENTS

| DE | 102009008959 A1 | 9/2009 |
|----|----|----|
| DE | 102010012877 A1 | 9/2011 |
| DE | 102010033729 A1 | 2/2012 |
| DE | 102016212774 A1 | 1/2017 |
| DE | 102015220695 A1 | 4/2017 |
| WO | 2009074206 A1 | 6/2009 |

* cited by examiner

*Primary Examiner* — Anthony R Jimenez
(74) *Attorney, Agent, or Firm* — Norton Rose Fulbright US LLP; Gerard Messina

(57) ABSTRACT

In a method for operating a vehicle, a planning map and a localization map are provided, the vehicle is localized on the localization map, a map corridor indicated in the planning map is selected based on the localization, a sensor corridor is ascertained using a sensor unit of the vehicle, and the map corridor is compared to the sensor corridor. Using a specified threshold value for a deviation between the map corridor and the sensor corridor, it is decided whether the map corridor and the sensor corridor are identical. The map corridor is utilized for operating the vehicle if the map corridor and the sensor corridor are identical, and the sensor corridor is utilized for operating the vehicle if the map corridor and the sensor corridor are not identical.

6 Claims, 3 Drawing Sheets

METHOD FOR OPERATING A VEHICLE

CROSS-REFERENCE TO RELATED APPLICATIONS

The present application claims priority under 35 U.S.C. § 119 to DE 10 2018 220 799.2 filed in the Federal Republic of Germany on Dec. 3, 2018, the content of which is hereby incorporated by reference herein in its entirety.

FIELD OF THE INVENTION

The present invention relates to a method for operating a vehicle.

BACKGROUND

Vehicles having an automatic driving function must be located preferably precisely. This presupposes that map data are flawless. After a map has been created, the actual conditions can change, however. For example, lane markings can be changed, guardrails can be moved, roads and bridges can be removed or built, and signs can be installed. For this reason, methods for map validation are necessary, which can ensure that maps are up-to-date.

Unexamined patent application DE 10 2016 212 774 A1 describes a method for producing a surroundings map for locating a vehicle in its surroundings.

SUMMARY

One object of the present invention is to provide a method for operating a vehicle that includes the following method steps. A planning map and a localization map are provided. The vehicle is located on the localization map. A map corridor indicated in the planning map is selected based on the localization. A sensor corridor is ascertained using a sensor unit of the vehicle. The map corridor is compared to the sensor corridor. Using a specified threshold value for a deviation between the map corridor and the sensor corridor, it is decided whether the map corridor and the sensor corridor are identical. The map corridor is utilized for operating the vehicle if the map corridor and the sensor corridor are identical. The sensor corridor is utilized for operating the vehicle if the map corridor and the sensor corridor are not identical. Advantageously, using the method, a validation of the map corridor takes place on the basis of a comparison with the sensor corridor. If the planning map is not up-to-date, the vehicle is operated by utilizing the sensor corridor. An adjustment of the planning map and/or of the localization map is not required. Due to the validation of the map corridor, the method can contribute to safety in traffic.

In a refinement, the localizing of the vehicle includes a detection of at least one first feature in surroundings of the vehicle contained in the localization map. The ascertainment of the sensor corridor includes a detection of a second feature in the surroundings of the vehicle. The first feature and the second feature are features of different categories. Due to the fact that the first feature and the second feature belong to different categories, the ascertainment of the map corridor and the ascertainment of the sensor corridor are decoupled from each other. This advantageously allows for a reliable validation of the map corridor.

In a refinement, a lane marking is detected as the second feature. Advantageously, a lane marking is suitable for determining the sensor corridor. Alternatively to the lane marking, a guardrail, or a curb can also be detected.

In a refinement, the lane marking is detected using a camera and/or using a LIDAR sensor unit of the vehicle. Advantageously, the lane marking can be easily detected using the camera and/or using the LIDAR sensor unit. Differences in intensity between marked and unmarked areas can be measured.

In a refinement, a radar localization map, a LIDAR localization map, or a camera localization map can be utilized as the localization map.

The above-described properties, features, and advantages of this present invention, as well as the manner in which these are achieved, are more clearly and considerably better understood in conjunction with the following description of the example embodiments, which are explained in greater detail in conjunction with the drawings.

DETAILED DESCRIPTION

Figure 1:
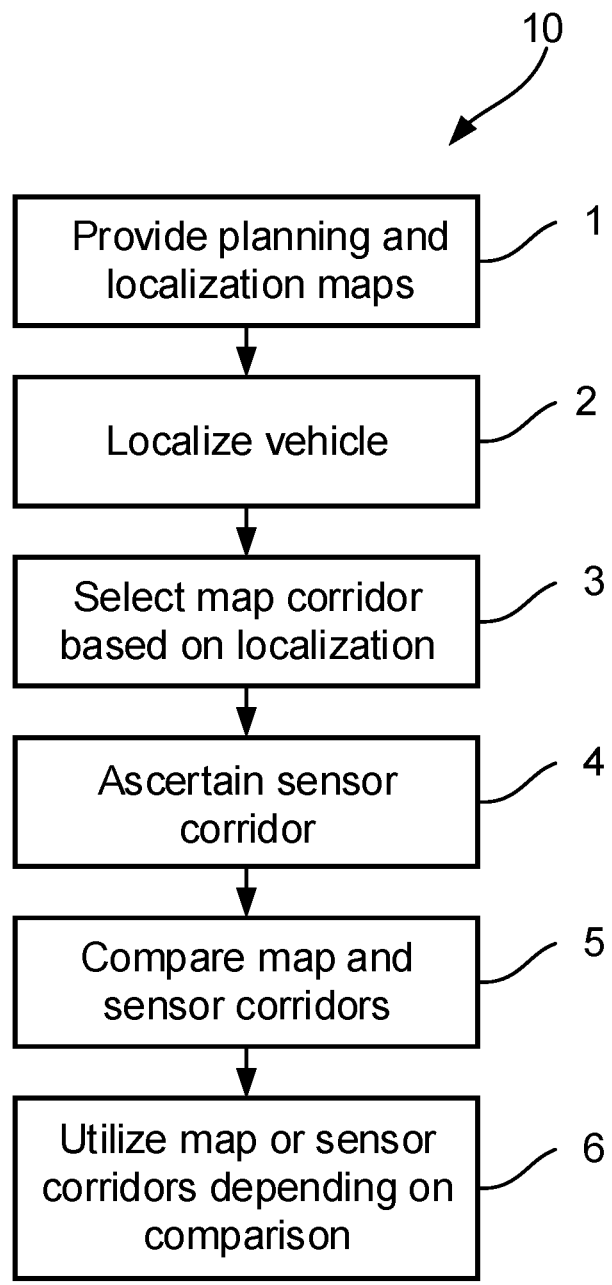
FIG. 1 is a flowchart that illustrates a method for operating a vehicle according to an example embodiment of the present invention.

FIG. 1 schematically shows method steps 1-6 of a method 10 for operating a vehicle.

The vehicle can be an arbitrary motor vehicle. The vehicle can also be designed as an automated vehicle. The automated vehicle can be steered using an automatic driving function.

In a first method step 1, a planning map and a localization map are provided. Information regarding driving corridors and lane markings is indicated in the planning map. The lane markings can be present in the planning map, for example, in the form of polylines. The lane markings subdivide the driving corridors into lanes. The driving corridors and the lanes can be traveled by the vehicle.

Information regarding sensor-specific features in surroundings represented by the localization map is indicated in the localization map. The sensor-specific features can be detected using a sensor unit of the vehicle. A pose of the vehicle, i.e., a position and an orientation of the vehicle, can be determined with respect to at least one feature indicated in the localization map. This makes it possible to localize the vehicle on the localization map.

The localization map can be designed, for example, as a camera localization map. Features, which are recognizable using a camera of the vehicle, are indicated in the camera localization map. Alternatively, the localization map can also be designed as a LIDAR localization map. The LIDAR localization map contains features that are detectable using a LIDAR sensor unit of the vehicle. Alternatively, the localization map can also be designed as a radar localization map, in which features are indicated that are detectable using a radar sensor unit of the vehicle.

In a second method step 2, the vehicle is localized on the localization map. A pose of the vehicle in relation to the localization map is ascertained. The localizing of the vehicle takes place by detecting at least one first feature, which is contained in the localization map, in the surroundings of the vehicle using the sensor unit. The sensor unit can be designed as a radar sensor unit, as a LIDAR sensor unit, or as a camera.

In a third method step 3, a map corridor indicated in the planning map is selected based on the localizing of the vehicle. A suitable driving corridor in the planning map, which is traveled by the vehicle, is therefore ascertained from all driving corridors contained in the planning map on the basis of the ascertained pose of the vehicle in relation to the localization map. This ascertained driving corridor is referred to herein as a map corridor.

In a fourth method step 4, a sensor corridor is ascertained using the sensor unit or using a further sensor unit of the vehicle. The driving corridor is referred to herein as the sensor corridor, which is situated in a detection range of the sensor unit or of the further sensor unit during the operation of the vehicle and which is detectable using the sensor unit or the further sensor unit of the vehicle. The sensor corridor is therefore ascertained independently of map data. Either the radar sensor unit, the LIDAR sensor unit, or the camera can be utilized for ascertaining the sensor corridor. If, in second method step 2, for example, the radar sensor unit is utilized for localizing the vehicle, then, in fourth method step 4, for example, the LIDAR sensor unit can be utilized for ascertaining the sensor corridor. For example, it is also possible, however, that the LIDAR localization unit is utilized in second method step 2 and in fourth method step 4.

The ascertainment of the sensor corridor can include a detection of a second feature in the surroundings of the vehicle. The first feature, which is detected in order to localize the vehicle within the scope of second method step 2, and the second feature, which is detected in order to ascertain the sensor corridor, can be features of different categories. For example, a lane marking can be detected as the second feature in order to ascertain the sensor corridor. In this case, no lane marking is detected for the purpose of localizing the vehicle. The localizing of the vehicle and the ascertainment of the sensor corridor are therefore decoupled from each other in that the first feature and the second feature belong to different categories.

In addition to lane markings, other features can also be detected in order to ascertain the sensor corridor. For example, guardrails and curbs can be utilized in order to ascertain the sensor corridor. Other features, such as trees and other green spaces, can also be detected. The only precondition is that the first feature is detectable using a sensor unit of the vehicle. Curbs are advantageous, for example, for ascertaining the sensor corridor, in particular in urban surroundings of the vehicle. As compared to lane markings, guardrails and curbs can also be detected using the radar sensor unit of the vehicle. In the case of lane markings, however, it is advantageous to utilize the camera and/or the LIDAR sensor unit, since, in this case, intensity ratios between marked and unmarked areas of a driving corridor can be ascertained, which can be differentiated from one another.

In a fifth method step 5, the map corridor is compared to the sensor corridor. For example, using a specified threshold value for a deviation between the map corridor and the sensor corridor, it can be decided whether the map corridor and sensor corridor 7 are identical. For example, distances between the map corridor and the sensor corridor can be ascertained at specified distances away from the vehicle. A threshold value can be specified for each distance, which indicates a maximum distance between the map corridor and the sensor corridor, within which the map corridor and the sensor corridor are to be considered identical. If the distance is less than the threshold value, the map corridor and the sensor corridor are evaluated as identical. If the distance is greater than the threshold value, the map corridor and the sensor corridor are evaluated as not identical. It is also possible, for example, to ascertain a mean value of the distances and to specify a threshold value for the mean value, in order to decide whether the map corridor and the sensor corridor are identical. Alternatively or additionally, a curvature of the map corridor can be compared to a curvature of the sensor corridor, in order to detect significant deviations between the map corridor and the sensor corridor.

In a sixth method step 6, the map corridor is utilized for operating the vehicle if the map corridor and the sensor corridor are identical. In this case, the vehicle can be steered along the map corridor using the automatic driving function. The sensor corridor is utilized for operating the vehicle if the map corridor and the sensor corridor are not identical. In this case, the vehicle is therefore steered along the sensor corridor. Therefore, either a release of the map corridor or a blocking of the map corridor takes place.

Figure 2:
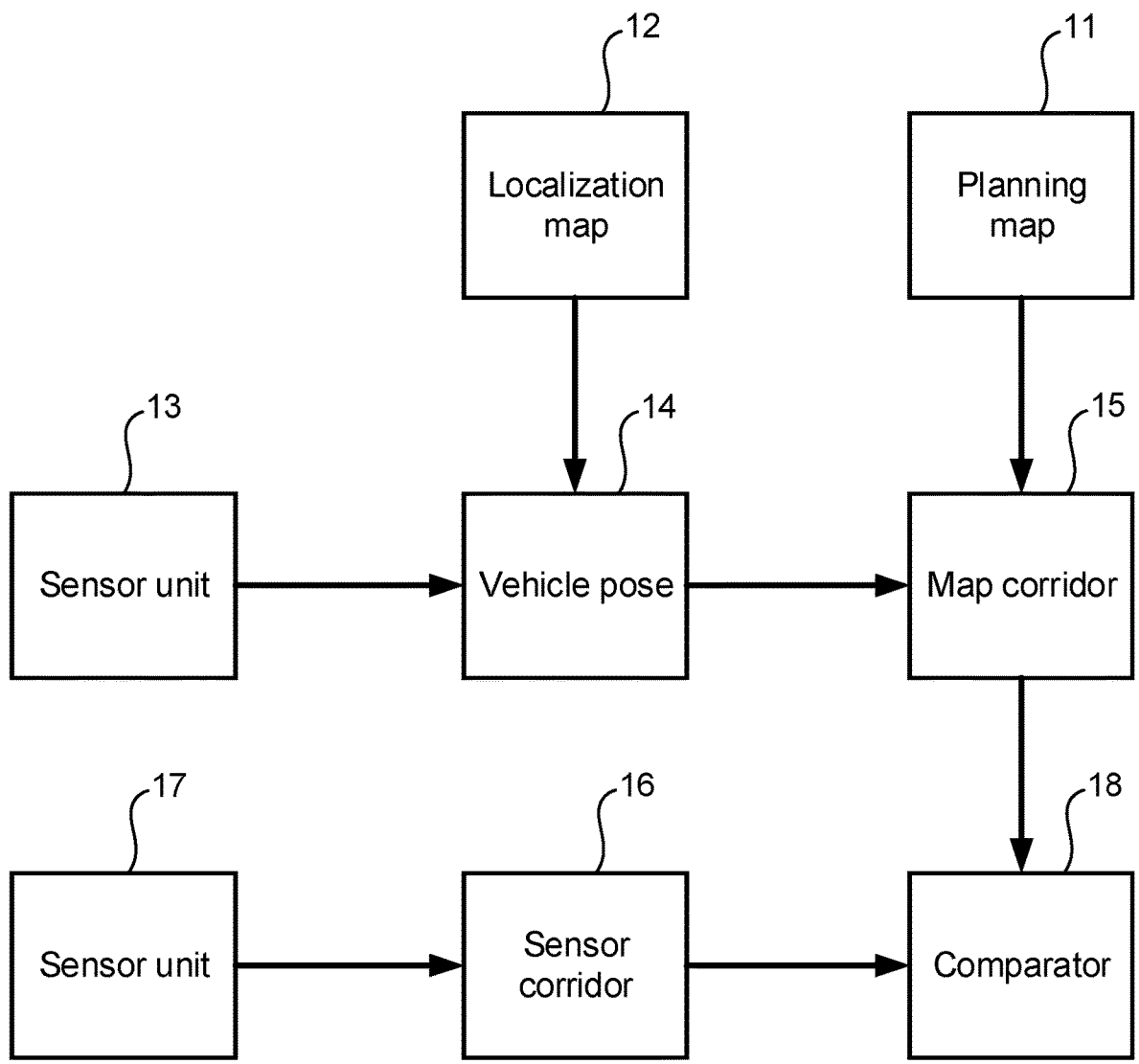
FIG. 2 schematically shows a representation of a layout of the method, according to an example embodiment of the present invention.

FIG. 2 shows a layout of method 10. After planning map 11 and localization map 12 have been provided, the vehicle is localized on localization map 12 using sensor unit 13. Pose 14 of the vehicle in relation to localization map 12 is ascertained. On the basis of the localization of the vehicle, map corridor 15 is selected from planning map 11.

Sensor corridor 16 is ascertained using further sensor unit 17. Thereafter, map corridor 15 and sensor corridor 16 are provided to a comparator 18 of the vehicle. Comparator 18 compares map corridor 15 to sensor corridor 16. A release of map corridor 15 takes place if map corridor 15 and sensor corridor 16 are identical. If map corridor 15 and sensor corridor 16 are not identical, map corridor 16 is not released for operating the vehicle, but rather is blocked. Sensor corridor 16 is then utilized for operating the vehicle.

Figure 3:
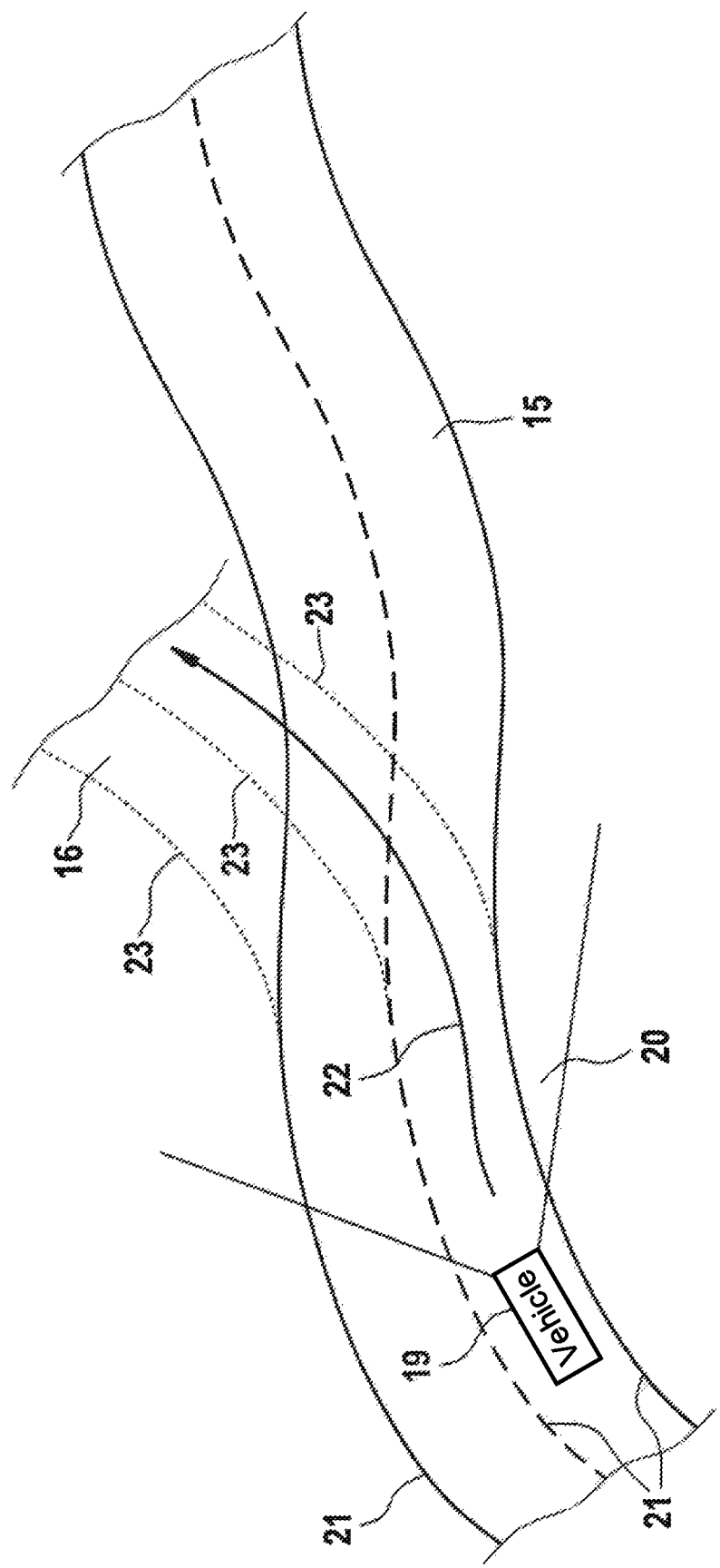
FIG. 3 schematically shows a representation of a scenario during a carrying-out of the method, according to an example embodiment of the present invention.

FIG. 3 schematically shows an exemplary scenario during the carrying-out of method 10. FIG. 3 shows map corridor 15 and its lane markings 21. Map corridor 15 was selected from the planning map based on the localization of vehicle 19 on the localization map. Vehicle 19 is located on map corridor 15. FIG. 3 also shows, by way of example, a detection range 20 of one or multiple sensor unit(s) 13, 17 of vehicle 19. With the aid thereof, for example, lane markings 23 can be detected, in order to ascertain sensor corridor 16. Sensor corridor 16 is represented in FIG. 3 using dotted lane markings 23.

In the represented example of FIG. 3, the result of the comparison of map corridor 15 with sensor corridor 16 is that these are not identical. In this case, sensor corridor 16 is utilized for operating the vehicle, as is represented in FIG. 3 using a trajectory 22, which follows a lane of sensor corridor 16, along which vehicle 19 is steered.

What is claimed is:
1. A method for a vehicle, the method comprising:
   localizing the vehicle on a localization map;
   selecting a map corridor indicated in a planning map based on the localization;
   ascertaining a sensor corridor, which is a driving corridor, using a sensor unit of the vehicle;
   comparing the map corridor to the sensor corridor;
   determining, based on the comparing, whether there is at least a threshold deviation between the map corridor and the sensor corridor;
   performing a selection according to a programming that is predefined to cause selection of the map corridor when it is determined in the determining that the threshold deviation is not present and to cause selection of the sensor corridor when it is determined in the determining that the threshold deviation is present; and operating the vehicle using the selected corridor;

wherein the driving corridor is situated in a detection range of the sensor unit or of a further sensor unit during the operation of the vehicle and which is detectable using the sensor unit or the further sensor unit of the vehicle, and wherein the sensor corridor is ascertained independently of map data, and wherein distances or mean distances between the map corridor and the sensor corridor are ascertained at specified distances from the vehicle, wherein a particular threshold deviation is specified for each of the distances or mean distances, which indicates a maximum distance between the map corridor and the sensor corridor, within which the map corridor and the sensor corridor are considered identical, and wherein when the distances or mean distances are less than the threshold deviation, the map corridor and the sensor corridor are evaluated as identical, and when the distances or mean distances are not less than the threshold deviation, the map corridor and the sensor corridor are evaluated as not identical.

2. The method of claim 1, wherein the localization map is a radar, a LIDAR, or a camera localization map.

3. The method of claim 1, wherein a curvature of the map corridor is compared to a curvature of the sensor corridor to detect deviations between the map corridor and the sensor corridor.

4. The method of claim 1, wherein the localization of the vehicle includes a detection in surroundings of the vehicle of at least one first feature that is of a first category and which is contained in the localization map, and wherein the ascertainment of the sensor corridor includes a detection in the surroundings of the vehicle of a second feature that is of a second category which is different than the first category.

5. The method of claim 4, wherein the second feature is a lane marking.

6. The method of claim 5, wherein the lane marking is detected using a camera and/or a LIDAR sensor of the vehicle.

* * * * *